United States Patent Office 3,174,830
Patented Mar. 23, 1965

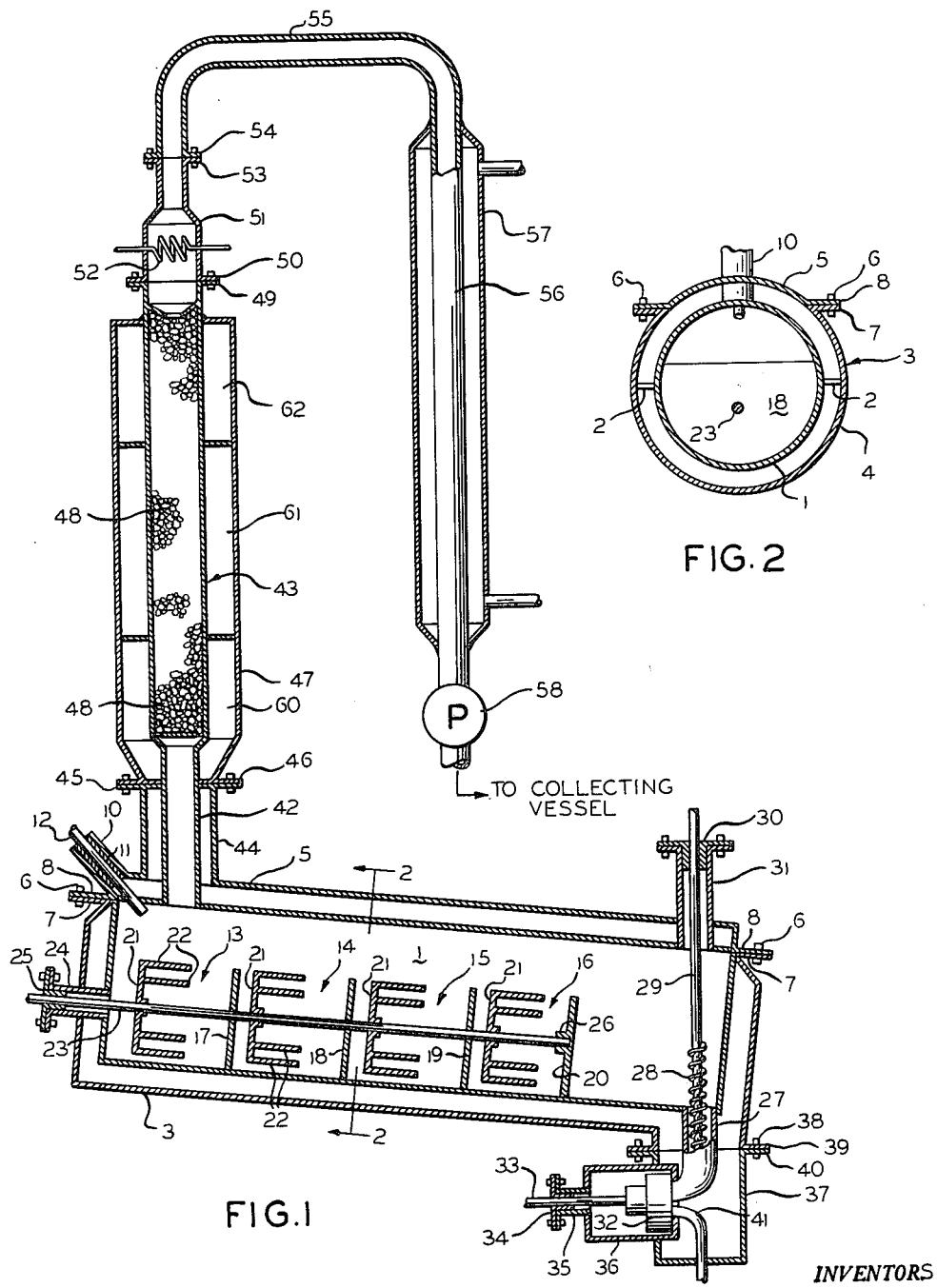

3,174,830
APPARATUS USEFUL IN THE CONTINUOUS POLY-
CONDENSATION OF DIOLESTERS OF TEREPH-
THALIC ACID
Anton Watzl, Kleinwallstadt (Main), and Richard Gerlach, Erlenbach (Main), Germany, assignors to Vereinigte Glanzstoff-Fabriken AG., Wuppertal-Elberfeld, Germany
Filed Feb. 14, 1961, Ser. No. 89,152
Claims priority, application Germany, Feb. 20, 1960, V 18,089
6 Claims. (Cl. 23—263)

This invention, in general, relates to apparatus for conducting chemical reactions and processes for producing polyethylene terephthalate and more particularly relates to continuous processes for making polyethylene terephthalate and apparatus especially useful for a continuous polycondensation process in the production of polyethylene terephthalate and the like from diolesters of terephthalic acid.

It is known that the production of polyethylene terephthalate can be carried out in two reaction stages. The reesterification of dimethyl terephthalate with ethylene glycol produces diglycol terephthalate which polycondenses with release of part of the esterified glycol. For various reasons, the two reactions—reesterification and polycondensation—are generally carried out in two stages. These two stages may follow each other immediately, e.g., in a single apparatus constructed in such a manner that the reaction material can be treated under different conditions. For example, tube systems may be used through which the reaction material passes successively, the material flowing first downwardly and then upwardly. The temperatures in the different tubes of the system may differ, i.e., they increase in the direction of flow. Furthermore, it is possible to segregate the volatile compounds produced by the reaction, such as methanol and glycol, and to add at the beginning of the polycondensation a suitable catalyst, if required. In order to obtain suitable polymers in such apparatus, it is naturally necessary to construct the apparatus in such a manner that enough time is available for each reaction so that it may be carried through to completion. It is quite evident that there are many advantages in the operation with a "fully continuous unit," but that such prior art arrangements require very exact control and are subject to operational difficulties.

A continuous operation, i.e., an operation which, if desired, may feed the produced polycondensate immediately to spinning apparatus, is also possible if diglycol terephthalate is produced in a separate stage and continuously fed into a polycondensation zone from which polymers are discharged in suitable quantities.

Processes and equipment are known which deal with the problems arising in such an operation. Such a problem is, for instance, the removal of the volatile compounds produced during the polycondensation. At the beginning of the reaction, the release of glycol is particularly violent. At the temperature used, the reaction material is of very fluent consistency, so that the glycol is easily separated and removed. On the other hand, at these increased temperatures and reduced pressure, the reaction material may start to foam violently which must be considered disadvantageous. With progressing reaction, the reaction material becomes more viscous and the removal of the volatile compounds becomes more difficult.

It is an object of the invention to provide a process for the continuous production of polyethylene terephthalate, which process can be operated over extensive periods without shutdown.

Another object is to provide improvements in apparatus especially useful for conducting continuous polycondensation processes such as the continuous polycondensation of di-ethylene glycol terephthalate.

Other and further objects of the invention will be apparent from the following description and claims together with the accompanying drawing, which, by way of illustration, shows preferred embodiments of the invention and the principles thereof in what we now consider to be the best modes contemplated for applying these principles. Other embodiments of the invention embodying the same or equivalent principles may be used and structural changes may be made as desired by those skilled in the art without departing from the true spirit and principles of the invention.

In the drawing:
FIG. 1 is a side elevation in cross-section of an embodiment of the apparatus of the invention; and
FIG. 2 is a cross-sectional view taken on section 2—2 of FIG. 1.

Briefly, this invention relates to a process and apparatus useful therein in which di-ethylene glycol terephthalate is polycondensed in a compartmented reaction vessel equipped with a stirrer. The vaporized ethylene glycol, plus some vapors of di-ethylene glycol terephthalate and low molecular weight oligomers vaporized from the reaction mass with the ethylene glycol, are drawn off from the reaction vessel by application of a vacuum. The vapors are passed through a packed fractionation tower, in the lower part of which the higher molecular weight constituents condense while the ethylene glycol vapors pass through the tower. The condensed di-ethylene glycol terephthalate and lower molecular weight oligomers are returned to the reaction vessel where they can be reacted in the polycondensation reaction.

The best reaction vessels for purposes of the invention are the slightly inclined tubular vessels which are subdivided by overflow baffles into compartments, each of which has a one or two fingered stirrer. The stirrers are fixedly mounted on a rotatably-driven shaft passing through each compartment and stir the portions of the reaction material in each compartment and also transport it forward. The shape and location of the stirrer fingers provide a continual formation of thin layers of the polycondensing reaction material from which the volatile compounds can escape easily.

Referring to the illustrated embodiment, a tubular reaction vessel 1, which slopes downwardly with respect to the horizontal in the direction from its feed end to its discharge end, is mounted by any suitable means, such as the plates 2, on a cylindrical heating jacket 3. The cylindrical jacket 3 is composed of a lower segment 4 and an upper segment 5 bolted together by bolts 6 in flanges 7 and 8 of the segments 4 and 5, respectively. This heating jacket is supplied with a suitable heating fluid for the purpose of maintaining the reaction tube 1 at the desired temperature.

The upper segment 5 of the jacket 3 has a tubular sleeve 10 projecting from one end thereof in which is mounted inside gas-tight packing 11 a tubular conduit 12 for feeding the reacted chemical or chemicals to the reaction tube 1 at the upper end thereof.

The reaction tube 1 is divided into a series of compartments 13, 14, 15 and 16 by a series of plates 17–20 functioning as overflow baffles. These baffles terminate short of the top of the reaction tube 1 so that there is an uninterrupted passage for vapors given off in the reaction tube.

Each of the compartments 13–16 contains an agitator 21, the radial arms of which contain a pair of fingers or paddles 22 lying in a plane substantially parallel with the axis of rotation of the agitators. The agitators 21 have a radius which brings the outermost of the fingers 22 into close proximity to the bottom of the reaction tube 1 at the lowest point of travel and at about the level of the uppermost edges of the overflow baffles 17-20 at their highest point of travel. These agitators are fixedly mounted on a rotatably-driven shaft 23 extending through the sleeve 24 in one end of the reaction tube 1 and projecting through the heating jacket 3. The sleeve 24 contains a journal bearing 25 in which the shaft 23 is rotatably supported. This bearing is substantially fluid-tight. The other end of the shaft 23 is rotatably-mounted in the journal bearing 26 in the plate 20.

In the polycondensation of di-ethylene glycol terephthalate, the latter is fed to the reaction tube 1 through conduit 12. The polycondensation reaction begins in the compartment 13. A portion of the reaction mass in compartment 13 spills over into compartment 14 and so on through each compartment until the polycondensate spills over the last plate 20. As the reaction mass proceeds from compartment to compartment, it becomes more viscous because the degree of polycondensation increases in each compartment. The reaction mass in each compartment is agitated by the agitators 21, which spread out the reaction mass into a relatively thin layer at the top of each compartment so that vaporizable constituents in the viscous mass can escape more easily. The agitators also aid in moving the reaction mass in a forward direction from compartment to compartment.

The polycondensation reaction is essentially complete in the compartment 16, and the polycondensate discharged therefrom flows toward the lowermost corner of the reaction vessel 1, which corner contains a discharge pipe 27 into which extends a rotatably-driven worm 28. The worm 28 is driven by the shaft 29 which is journalled in the journal bearing 30 mounted in the outer end of a vertically-projected sleeve 31 mounted in the top of the reaction tube 1. The worm 28 conveys the viscous polycondensate mass to a pump 32 rotatably-driven by shaft 33. The shaft 33 is journalled in journal bearing 34 which, in turn, is mounted in sleeve 35 of a pump compartment housing 36. The pump housing 36, in turn, is mounted in a depending, hollow segment 37 attached by bolts 38 in flanges 39 and 40 to the heating jacket 3. The hollow segment 37 communicates with the heating jacket 3 so that the discharged polycondensate does not solidify.

The polycondensate is pumped by pump 32 into the tubular line 41 which can convey the polycondensate melt to a suitable collection vessel or directly to a spinning apparatus for spinning the polycondensate into filaments.

Near the uppermost corner of the reaction tube 1, there is provided an outwardly-extending tube 42 which communicates with the vapor space in the reaction tube 1 at one end of the tube 42 and with a packed fractionation tower 43 at the other end of the tube. This tube is concentrically-positioned within an upwardly projecting sleeve 44 mounted in the upper segment 5 of the heating jacket 3. The upper end of the sleeve 44 has a flange 45 to which is bolted a flange 46 of the jacket 47 for the fractionation tower 43. The flanges 45 and 46 separate the sleeve 44 of the heating jacket 3 from the jacket 47 in the fractionation tower 43.

The fractionation tower 43 is packed with a suitable solid packing 48. It has been found that glazed saddle packing is especially excellent packing material for the separation of ethylene glycol from higher molecular weight constituents vaporized in the polycondensation of di-ethylene glycol terephthalate.

The upper end of the packed fractionation tower 43 has a flange 49 bolted to the flange 50 of a condenser 51. The condenser 51 contains a cooling coil 52, the upper end of which has a flange 53 bolted to the flange 54 of the return bent pipe 55. The leg 56 of the return bent pipe 55 has a water-cooling jacket 57 mounted thereabout. This water-cooling jacket is used to condense ethylene glycol vapors in the leg 56.

A vacuum is drawn on the entire system, including the reactor tube 1, the condenser tower 51 and pipe 55 by a vacuum pump located at any convenient point. In the drawing, the pump 58 is located just below the water-cooling jacket 57. This is by way of illustration only inasmuch as other locations are equally suitable for the purpose of maintaining the aforesaid vacuum.

The condensed ethylene glycol is conveyed to a collection vessel, from which it can be drawn for use in the preparation of the di-ethylene glycol terephthalate.

The fractionation tower is filled with ceramic pieces, by preference glazed saddle packing. The tower is heated in stages by the divided sections 60, 61 and 62 of the jacket 47 in such a manner that all monomer and oligomer constituents carried along by the evaporating glycol condense in the tower while on the other hand, for practical purposes, no liquid glycol exists at the bottom of the tower. It is preferable to position the fractionation tower 43 in such a manner that the returned monomers or oligomers drop into the first compartment 13 of the reaction tube 1. Glazed saddle packing is preferred because the saddles make contact with each other only at points so that there are no waste spaces in which further condensation can take place in the tower. Such additional condensation, i.e., the formation of polymers in the fractionation tower, would cause considerable trouble because polymers, which might catch between the ceramic pieces, would decompose on account of the high temperatures. The decomposition products eventually would drop into the reaction vessel. They would cause decoloration of the polyester.

In the polycondensation of di-ethylene glycol terephthalate, the latter is at a temperature of 265° C. to 270° C. when it is fed via pipe 12 to the reactor tube 1. The reactor tube 1 is maintained at a temperature of about 275° C. to 285° C. and the vacuum on the system is in the range of about 1 to 0.2 mm. Hg absolute. The temperature in the bottom portion of the packed fractionation tower 43 is in the range of about 180° C. to 190° C. At the middle of the tower, it is in the range of 140° C. to 160° C. At the top of said tower it is in the range of 120° C. to 125° C. The temperature in the condenser 51 is in the range of 92° C. to 98° C.

In a specific embodiment of the invention, di-ethylene glycol terephthalate at a temperature of 265/270° C. is pumped at a rate of 6 kg. per hour via pipe 12 into the reaction tube 1. The reaction tube is maintained at a temperature of 280° C.±5° C. by a heating fluid in the jacket 3. The di-ethylene glycol terephthalate is progressively polycondensed with the released ethylene glycol vapors as it flows through successive compartments 13-16 while the polycondensation mass is agitated in each compartment by the agitators 21. The viscous polycondensate product is discharged from the tube 1 by the rotating worm 28, after which it is pumped by pump 32 to a collection vessel.

The ethylene glycol vapors, plus some di-ethylene glycol terephthalate vapors and some vaporized, low molecular weight oligomers (polycondensates of low degrees of polycondensation), are drawn through the fractionation tower 43 packed with glazed saddle packing. The vacuum on the whole system is maintained at 1.0-0.2 mm. Hg. The equilibrium temperature at the bottom of the tower is about 180/190° C., about 140/160° C. at the middle of the tower, and 120/125° C. at the top of the tower. The temperature of the vapors in the condenser 51 is about 92/98° C. The substances condensed in the bottom section of the tower are the monomers and oligomers (primarily di-ethylene glycol terephthalate plus polyethylene terephthalate oligomers). These liquified portions drop back into the first compartment 13 in the reaction tube 1.

The vapors passing through pipe 55 are condensed by passing cold water through the water jacket 57. The condensate is essentially all ethylene glycol.

The polymers produced by the apparatus covered by this invention excel by their uniformly good physical properties so that they can be delivered immediately to the spinning apparatus. The removal of the polyethylene terephthalate from reaction tube 1 must be done by a mechanical conveyor because of the vacuum in the reaction tube.

Whereas, previously known polyethylene terephthalate polycondensation apparatus will not operate continuously under suitable vacuums of 10–20 mm. Hg absolute, or even as low as 0.5 mm. Hg absolute, it is possible to operate continuously for weeks without trouble in the process herein described with the apparatus of this invention.

The invention is hereby claimed as follows:

1. Apparatus for continuous polycondensation reactions comprising an inclined, closed reaction tube subdivided by baffles into compartments with a vapor space above said compartments, a rotatable agitator in said compartments, means for heating said reaction tube, a discharge pipe in the lowermost end of said reaction tube, a rotatable worm positioned in said pipe, means for feeding polycondensable chemicals into said reaction tube at the opposite end thereof, a packed fractionation tower communicating with said vapor space in said reaction tube, and means for maintaining a vacuum in said tower and said reaction tube.

2. The apparatus of claim 1 wherein said fractionation tower is packed with glazed ceramic saddle packing.

3. Apparatus for continuous polycondensation reactions comprising a slightly inclined, closed reaction tube subdivided by baffles into compartments with a vapor space above said compartments, a rotatable agitator in said compartments, said agitator including a shaft extending longitudinally through said compartment, hubs mounted on said shaft in said compartments, agitator arms extending from said hubs in directions substantially parallel to said shaft, means for heating said reaction tube, a discharge pipe in the lowermost end of said reaction tube, means for feeding polycondensable chemicals into said reaction tube at the opposite end thereof, a packed fractionation tower communicating with said vapor space in said reaction tube, and means for maintaining a vacuum in said tower and said reaction tube.

4. Apparatus for continuous polycondensation reactions comprising a slightly inclined, closed reaction tube subdivided by baffles into compartments with a vapor space above said compartments, a rotatable agitator in said compartments, means for heating said reaction tube, a discharge pipe in the lowermost end of said reaction tube, a rotatable worm positioned in said pipe, a pump downstream from said worm and connected to said discharge pipe for pumping viscous polycondensate out of said reaction tube, means for feeding polycondensable chemicals into said reaction tube at the opposite end thereof, a packed fractionation tower communicating with said vapor space in said reaction tube, and means for maintaining a vacuum in said tower and said reaction tube.

5. Apparatus as claimed in claim 4, and a heating jacket about said reaction tube, said discharge pipe and said pump.

6. Apparatus as claimed in claim 3 wherein said compartments are defined by the lower portions of the wall of said reaction tube and transversely extending baffle walls extending across the lower portion of said reaction tube, the upper edges of said baffle walls being of substantially equal height relative to the bottom of said vessel, whereby reaction product travelling through said inclined reaction tube spills progressively over said baffle walls from one compartment to the next compartment and whereby substantially equal depths of reaction product are maintained in each compartment.

References Cited in the file of this patent

UNITED STATES PATENTS

| | | |
|---|---|---|
| 2,546,691 | Green | Mar. 27, 1951 |
| 2,758,105 | Alles et al. | Aug. 7, 1956 |
| 2,758,915 | Vodonik | Aug. 14, 1956 |
| 2,768,070 | Brazaitis | Oct. 23, 1956 |
| 2,869,838 | Ryder | Jan. 20, 1959 |
| 2,964,391 | Benson | Dec. 13, 1960 |
| 2,973,341 | Hippe et al. | Feb. 28, 1961 |
| 3,019,895 | Loevenstein et al. | Feb. 6, 1962 |
| 3,057,702 | Pierce et al. | Oct. 9, 1962 |

FOREIGN PATENTS

| | | |
|---|---|---|
| 550,331 | Great Britain | Jan. 4, 1943 |